United States Patent [19]

Sheargold et al.

[11] Patent Number: 5,702,679
[45] Date of Patent: Dec. 30, 1997

[54] METHOD OF PREPARING $Li_{1+x}Mn_{2-x}O_4$ FOR USE AS SECONDARY BATTERY

[75] Inventors: Stephen W. Sheargold; Terrell N. Andersen, both of Edmond, Okla.

[73] Assignee: Kerr-McGee Chemical Corp., Oklahoma City, Okla.

[21] Appl. No.: 540,116

[22] Filed: Oct. 6, 1995

[51] Int. Cl.$^6$ ............................................. C01G 45/12
[52] U.S. Cl. ............................................. 423/599; 429/224
[58] Field of Search ............................... 423/599; 429/224

[56] References Cited

U.S. PATENT DOCUMENTS

| | | |
|---|---|---|
| 4,980,251 | 12/1990 | Thackeray et al. ............... 423/599 |
| 5,153,081 | 10/1992 | Thackeray et al. ............... 423/599 |
| 5,211,933 | 5/1993 | Barboux et al. ................. 423/599 |
| 5,561,006 | 10/1996 | Lecerf et al. .................. 423/599 |

*Primary Examiner*—Wayne Langel
*Attorney, Agent, or Firm*—Herbert M. Hanegan; J. Rodgers Lunsford, III

[57] ABSTRACT

A continuous method of preparing a single phase lithiated manganese oxide intercalation compound of the formula $Li_{1+x}Mn_{2-x}O_4$ comprising the steps of: mixing intimately a lithium hydroxide or a lithium salt and a manganese oxide or a manganese salt; feeding the intimately mixed salts to a reactor; continuously agitating the mixed salts in the reactor; heating the agitated mixed salts in the reactor at a temperature of from about 650° C. to about 800° C. for a time not in excess of about 4 hours in an oxygen-containing atmosphere; and cooling the reacted product to less than about 200° C. in an oxygen-containing atmosphere for a time not in excess of about 2 hours.

61 Claims, 10 Drawing Sheets

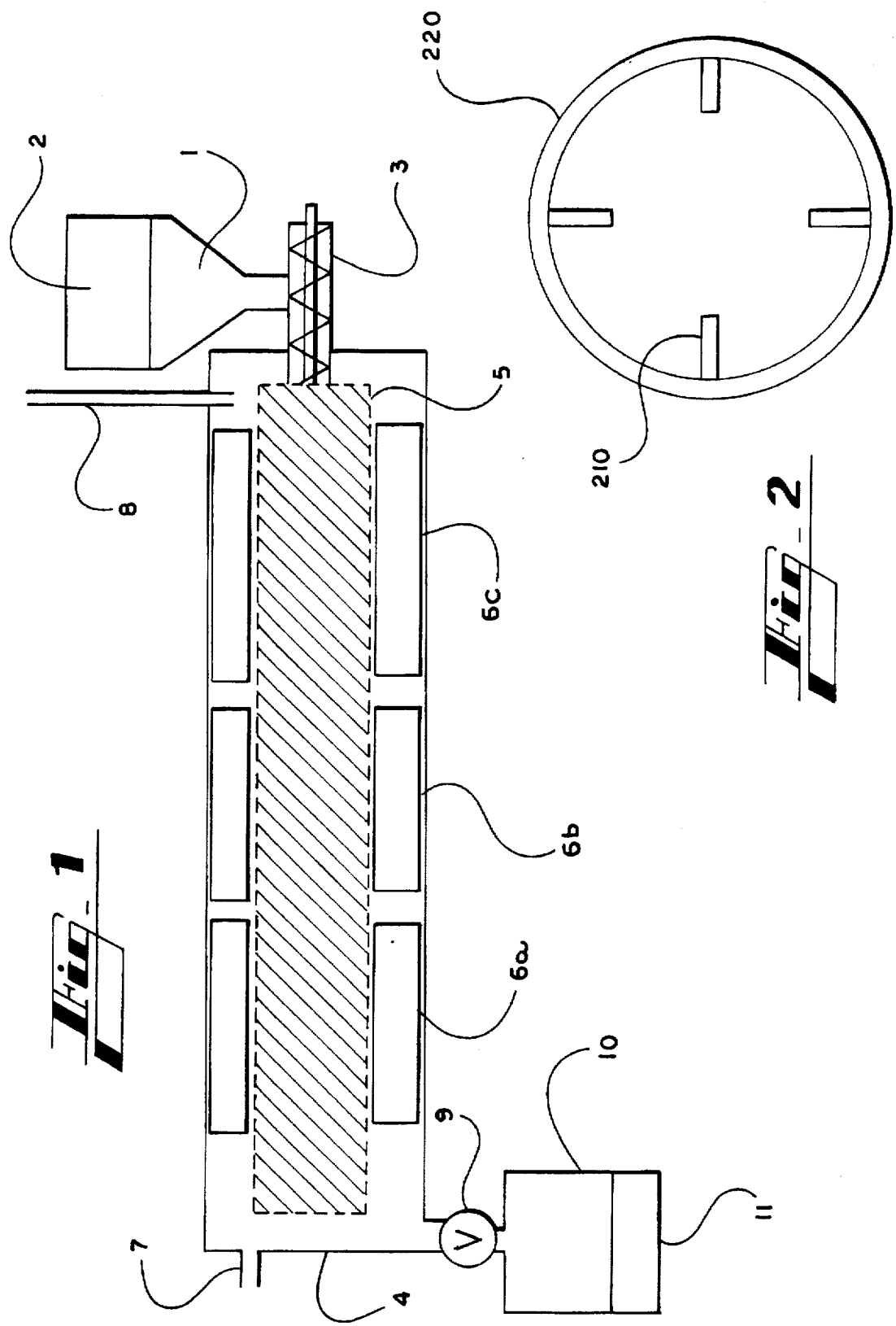

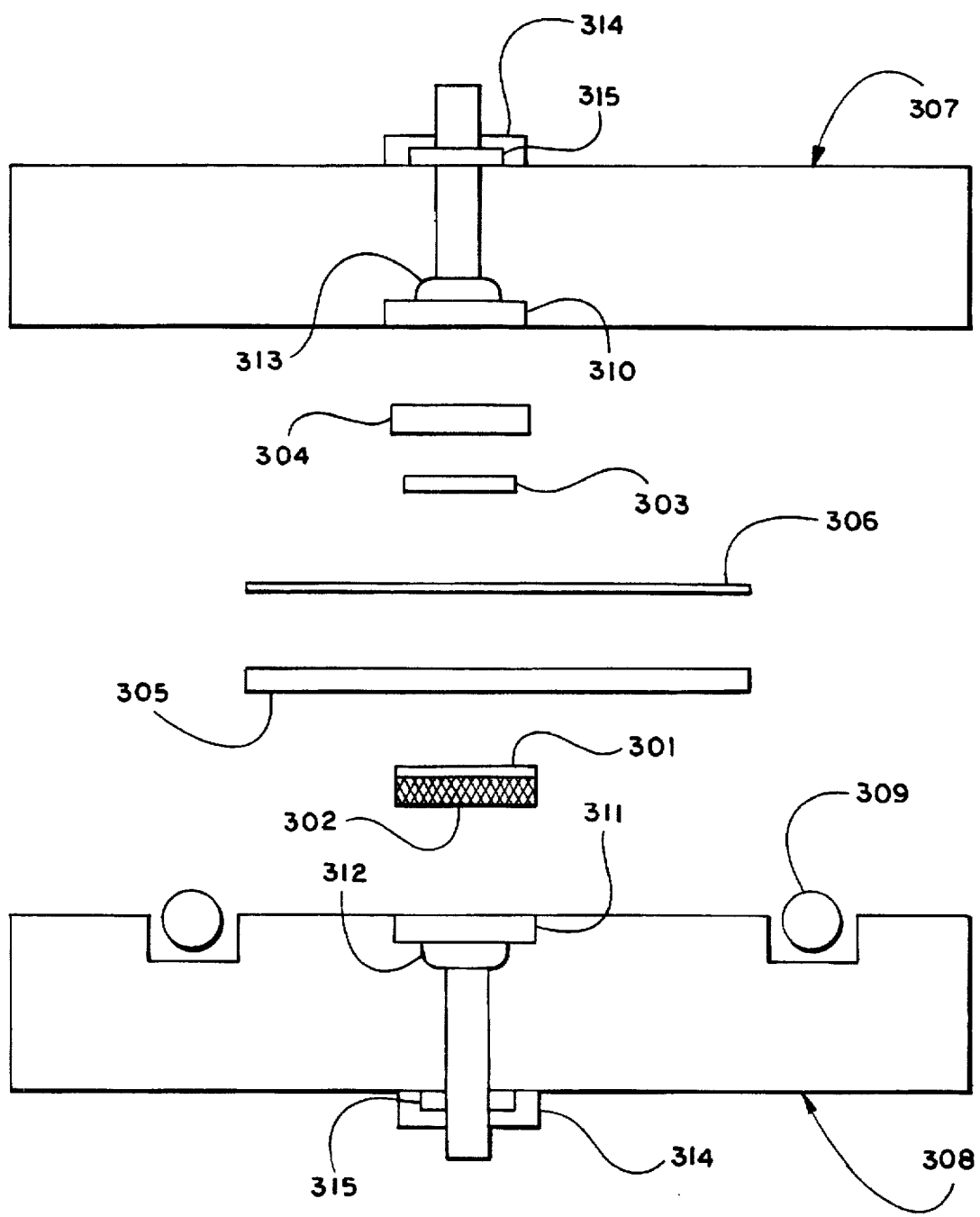
Fig_3

CYCLING CURVE FOR SAMPLE C.

SLOPE = -0.26
INTERCEPT = 117.85
CORRELATION COEFFICIENT = 0.95

METHOD OF PREPARING $Li_{1+x}Mn_{2-x}O_4$ FOR USE AS SECONDARY BATTERY

FIELD OF THE INVENTION

This invention relates to a continuous method for the preparation of fine powders and/or films of lithium containing ternary oxides. More specifically, the present invention relates to the synthesis of $Li_{1+x}Mn_{2-x}O_4$ which is an intercalatable compound of interest for secondary batteries.

Heretofore, the lithium containing ternary hydroxides have been prepared by mixing the carbonates and oxides of the constituent compounds and heating the mixture at high temperatures. Although this method produces battery effective material, the lengthy times of reaction and cooling are commercially impractical.

BACKGROUND OF THE INVENTION

This invention relates to secondary, rechargeable lithium and lithium-ion batteries and, more particularly, relates to a continuous method for preparing $Li_{1+x}Mn_{2-x}O_4$ intercalation compounds for use as the positive electrode in such batteries where x is from about 0 to about 0.125.

Lithium-cobalt oxide is currently used as the positive electrode material in commercial four-volt lithium-ion cells. On the basis of their lower cost, raw material abundance, additional safety, environmental acceptability, and electrochemical performance, $Li_{1+x}Mn_{2-x}O_4$ intercalation compounds have shown exceptional promise as positive electrode materials in such cells. However, for the commecial success of $Li_{1+x}Mn_{2-x}O_4$ as a cathode material a process has not previously been found that will rapidly and economically produce a material with the required electrochemical performance properties. This invention addresses this issue.

$LiMn_2O_4$ ($Li_{1+x}Mn_{2-x}O_4$ where x=0) was synthesized as early as 1958 [D. G. Wickham and W. J. Croft, J. Phys. Chem. Solids 7 (1958) 351–360], by intimately mixing $Li_2CO_3$ and any manganese oxide, taken in the molar ratio of Li/Mn=0.50, reacting the mixture at 800°–900° C. in air, and repeatedly grinding and reacting the mixture at this temperature until the sample reached constant weight. Acid leaching of $LiMn_2O_4$ to produce $\lambda$-$MnO_2$, which possesses the $LiMn_2O_4$ crystal framework, and the subsequent usage of $\lambda$-$MnO_2$ as the positive electrode material in a lithium cell were reported by Hunter [J. C. Hunter (Union Carbide), U.S. Pat. No. 4,246,253, Jan. 20, 1981; J. C. Hunter (Union Carbide), U.S. Pat. No. 4,312,930, Jan. 26, 1982; J. C. Hunter, J. Solid State Chem. 39 (1981) 142–147.]. Hunter electrochemically reduced his $\lambda$-$MnO_2$ to $LiMn_2O_4$, which occurred at 4 V, but they did not cycle his cell. He also noted that lithium and manganese compounds other than those specified by Wickham and Croft may be used in the synthesis, provided that they decompose to lithium or manganese oxides under the reaction conditions used. Thackeray, et al. [M. Thackeray, P. Johnson, L. de Picciotto, P. Bruce and J. Goodenough, Mat. Res. Bull. 19 (1984) 179–187; M. Thackeray, L. de Picciotto, A. de Kock, P. Johnson, V. Nicholas and K. Adendorff, J. Power Sources 21 (1987)1–8]showed that Li intercalation into the $LiMn_2O_4$ spinel structure is electrochemically reversible, giving two voltage plateaus at ~4.1 V and 3.0 V vs Li, which correspond to the intercalation/de-intercalation of the first and second Li ions, respectively, into $\lambda$-$MnO_2$.

Various investigators studied the synthesis of $LiMn_2O_4$ by thermal reaction of a lithium and manganese compound, and found it could be effected over a large temperature range—i.e., 300°–900° C. The ability of the products to intercalate and de-intercalate Li was also investigated. The so-called "low" temperature materials, made at less than about 550° C., are poorly crystalline, have a distorted spinel structure, and cycle at about 3 V but not at 4 V vs Li [W. J. Macklin, R. J. Neat and R. J. Powell, J. Power Sources 34 (1991) 39–49; T. Nagaura, M. Yokokawa and T. Hashimoto (Sony Corp.), U.S. Pat. No. 4,828,834, May 9, 1989; M. M. Thackery and A. de Kock (CSIR), U.S. Pat. No. 4,980,251, Dec. 25, 1990; V. Manev, A. Momchilov, A. Nassalevska and A. Kozawa, J. Power Sources, 43–44 (1993) 551–559]. These are not the materials of focus in this patent application.

The so-called "high" temperature materials, made at about 600°–900° C. in an air atmosphere, are quite crystalline. They show cycling capability at about 4 V vs Li, but cycle much worse at 3 V vs Li, losing capacity rapidly [J. M. Tarascon, E. Wang, J. K. Shokoohi, W. R. McKinnon and S. Colson, J. Electrochem. Soc. 138 (1991) 2859–2868]. Even when $LiMn_2O_4$ is synthesized at low temperature, as in a sol-gel process, it can be cycled in the 4 V regime if it is first fired/annealed at high temperatures—e.g., 600°–800° C. [P. Barboux, F. K. Shokoohi and J. M. Tarasoon (Bellcore), U.S. Pat. No. 5,135,732, Aug. 4, 1992]. High temperature $LiMn_2O_4$ materials will be the focus the remainder of this application.

Investigators have generally found that synthesis of a single-phase product in their (static) muffle furnaces required many hours or even days of reaction time, which they often coupled with regrinding of the heated product and reheating of the reground powder [P. Barboux, F. K. Shokoohi and J. M. Tarasoon (Bellcore), U.S. Pat. No. 5,135,732, Aug. 4, 1992; W. J. Macklin, R. J. Neat and R. J. Powell, J. Power Sources 34 (1991) 39–49; A. Mosbah, A. Verbaire and M. Tournoux, Mat. Res. Bull. 18 (1983) 1375–1381; T. Ohzuku, M. Kitagawa, and T. Hirai, J. Electrochem. Soc. 137 (1990) 769–775]. Without such laborious synthesis procedures, various byproducts are produced in addition to $LiMn_2O_4$—i.e., $Mn_2O_3$, $Mn_3O_4$ and $Li_2MnO_3$. These substances are undesirable in lithium cells, creating low capacities and high fade rates.

Apart from the production of undesirable byproducts, the synthesis parameters also affect the molecular/crystal structure and physical properties of the $LiMn_2O_4$, and these material properties greatly affect the battery capacity and cyclability of the material. Momchilov, Manev and coworkers [A. Momchilov, V. Manev, and A. Nassalevska, J. Power Sources 41 (1993) 305–314] varied the lithium reactant, the $MnO_2$ reactant, the reaction temperature and reaction time prior to cooling in air. They found it advantageous to make the spinels from lithium salts with the lowest possible melting points and from $MnO_2$ samples with the greatest surface areas. The advantages were faster reaction times and more porous products, which gave greater capacities and better cyclability (i.e., less capacity fade with cycle number). However, the reaction times were the order of days in any case. These investigators also found [V. Manev, A. Momchilov, A. Nassalevska and A. Kozawa, J. Power Sources, 43–44 (1993) 551–559; A. Momchilov, V. Manev, and A. Nassalevska, J. Power Sources 41 (1993) 305–314.] that the optimum reaction temperature was approximately 750° C. At higher temperatures the material lost capacity, presumably due to a decreased surface area and from oxygen loss, which reduced some of the manganese in $LiMn_2O_4$. At the lower reaction temperatures, synthesis required even longer times, and evidence of spinel distortion occurred, which apparently caused lower capacities. These investigators also demonstrated advantage in preheating the reaction mix at temperatures just above the melting point of the lithium reactant before reacting at the final temperature.

Tarascon and coworkers [J. M. Tarascon, W. R. McKinnon, F. Coowar, T. N. Bowmer, G. Amatucci and D. Guyomard, J. Electrochem. Soc. 141 (1994) 1421–1431; J. M. Tarascon (Bellcore), International Patent Application WO 94/26666; U.S. Pat. No. 5,425,932, Jun. 20, 1995] found that high capacity and long cycle life were best achieved by (1) employing a reactant mixture in which the mole ratio of Li/Mn is greater than ½ (i.e., Li/Mn=1.00/2.00 to 1.20/2.00 so that x in $Li_{1+x}Mn_{2-x}O_4$=0.0 to 0.125), (2) heating the reactants for an extensive period of time (e.g., 72 h) at 800°–900° C., (3) cooling the reacted product in an oxygen-containing atmosphere at a very slow rate, i.e., preferably at 2° to 10° C./h, to about 500° C., and, finally, (4) cooling the product more rapidly to ambient temperature by turning off the furnace. The cooling rate from more than 800° C. to 500° C. can be increased to 30° C./h if the atmosphere is enriched in oxygen. These investigators found that the lattice parameter, $a_o$, of the product was an indicator of the product efficacy in a battery, and that a should be less than about 8.23 Å. By comparison, for $LiMn_2O_4$ made with Li/Mn=1.00/2.00 and with air cooling, a=8.247 Å.

Manev and coworkers [V. Manev, A. Momchilov, A. Nassalevska and A. Sato, J. Power Sources 54 (1995) 323–328] also found that a Li/Mn mole ratio greater than 1.00/2.00 is advantageous to both capacity and cyclability. They chose 1.05/2.00 as the optimum ratio. These investigators also found that as the amount of pre-mix/reactants in the muffle furnace was scaled up from ~10 g to ~100 g the capacity decreased significantly. This they traced to a depletion of air in the furnace and a resultant partial reduction of the product. The problem was alleviated by flowing air through the furnace. When the air flow was too great, the capacity of the product decreased again, so the air flow had to be optimized to be beneficial. Manev and coworkers found the most beneficial cooling rate to be several tens of degrees per minute, which is more than 100 times faster than that of Tarascon and coworkers. After optimizing all conditions, which included the use of lithium nitrate and a very porous chemical manganese dioxide as reactants, Manev and coworkers obtained a product $Li_{1+x}Mn_{2-x}O_4$ (with x=0.033) that gave a very high capacity and low fade rate. The use of lithium nitrate has negative impact on the process since poisonous $NO_x$ fumes are expelled during the synthesis. When Manev developed a successful synthesis process that utilized lithium carbonate rather than lithium nitrate [V. Manev, Paper given at 9th IBA Battery Materials Symposium, Cape Town, South Africa, Mar. 20–22, 1995. (Abstract available)], this new process once again involved a reaction time of several days.

Howard [W. F. Howard, Jr., in Proceedings of the 11th Int'l Seminar on Primary and Secondary Battery Technology & Application, Feb. 28–Mar. 3, 1994, Deerfield Beach, Fla., sponsored by S. P. Wolsky & N. Marincic] discussed possible $LiMn_2O_4$ production equipment, mainly from a cost viewpoint. Although he developed/presented no data, Howard suggested that a roary kiln transfers heat faster than a static oven, which serves to shorten reaction times.

The desirable slow cooling rate coupled with long thermal reaction times is very difficult to accomplish on a large scale, as in pilot-plant or commercial operation. Therefore, it would be highly desirable to shorten the reaction and cooling times while avoiding the unwanted byproducts and preserving the needed $Li_{1+x}Mn_{2-x}O_4$ stoichiometry and structure, the latter being evidenced by a smaller lattice parameter.

SUMMARY OF THE INVENTION

Lithium manganese oxides of the formula $Li_{1+x}Mn_{2-x}O_4$ (where x is from about 0 to about 0.125) and with lattice parameter of about 8.235 Å or less are prepared by mixing a lithium salt/hydroxide and a manganese oxide, continuously agitating the mixture while heating in an air, oxygen or oxygen enriched atmosphere at a temperature from about 650° to about 800° C. for about two hours or less, and cooling the product in about two hours or less by using similar agitation in an air, oxygen or oxygen enriched atmosphere.

BRIEF DESCRIPTION OF THE DRAWINGS

The present invention can be further understood with reference to the following description in conjunction with the appended drawings, wherein like elements are provided with the same reference numerals. In the drawings:

FIG. 1 is a schematic partially sectional view of the preferred embodiment of the continuous reactor employed in the process of this invention;

FIG. 2 is a cross-sectional view of the reactor shell of FIG. 1;

FIG. 3 is a cross section view of a non-aqueous laboratory cell;

DESCRIPTION OF THE PREFERRED EMBODIMENTS

Figure 4:
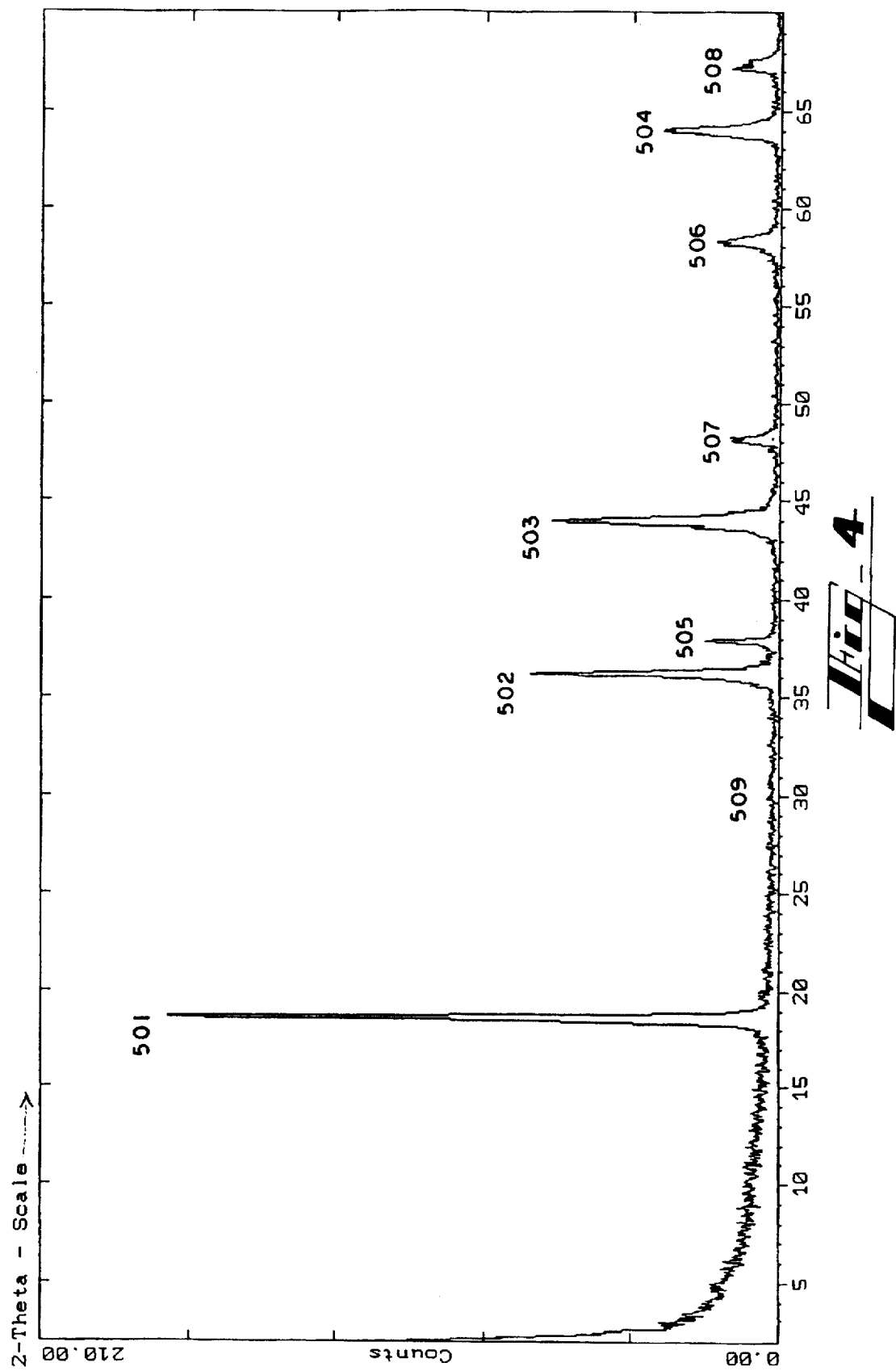
FIG. 4—[sample B] shows an X-ray diffraction pattern of $Li_{1+x}Mn_{2-x}O_4$ spinel prepared from LiOH and EMD heated in rotary kiln at 725° C. in air (2 h) and slow cooled (2½ h) in laboratory rotary kiln under $O_2$.
Figure 5:
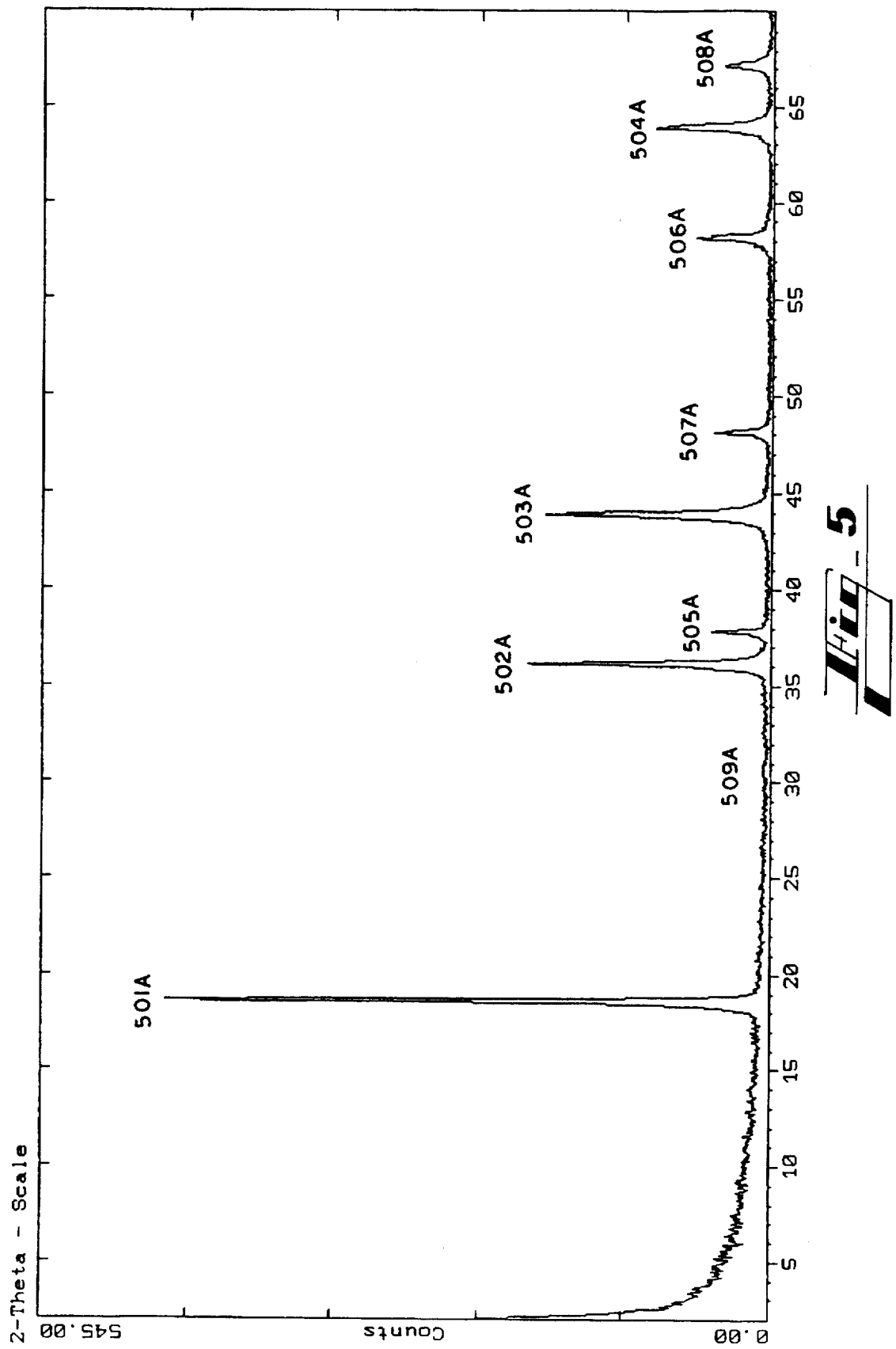
FIG. 5—[sample C] shows an X-ray diffraction pattern of $Li_{1+x}Mn_{2-x}O_4$ spinel prepared from LiOH and EMD heated in rotary kiln at 725 ° C. in air (2 h) and slow cooled (1½ h) in kiln under air.

The present invention is a continuous method of preparing a single phase lithiated manganese oxide intercalation compound of the formula $Li_{1+x}Mn_{2-x}O_4$ in which $0 \leq x \leq 0.125$ by intimately mixing, in stoichiometric amounts, based on the lithium manganese oxide formula, lithium hydroxide or a decomposable lithium salt and a manganese oxide or decomposable manganese salt; feeding the intimately mixed compounds to a reactor; continuously agitating the mixed salts in the reactor; flowing air, oxygen or oxygen enriched gas through the reactor; heating the agitated mixed compounds in the reactor at a temperature of from about 650° C. to about 800° C. for a time not in excess of about four hours; and preferably not in excess of two hours and cooling the reacted product under controlled conditions to less than about 100° C. This invention also relates to a method of synthesizing an essentially single phase lithium manganese oxide in accordance with the formula $Li_{1+x}Mn_{2-x}O_4$ in which $0 \leq x \leq 0.125$ and having a cubic spinel-type crystal structure. In particular, the invention relates to a method of synthesizing such oxide to produce an oxide which is suitable for use as a cathode in an electrochemical cell with an anode comprising lithium or a suitable lithium-containing alloy. The invention also relates to the oxide when produced by the method; and to an electrochemical cell comprising said oxide as its cathode.

According to the invention, a method of synthesizing a lithium manganese oxide having a spinel-type crystal structure comprises forming a mixture in finely divided solid form of at least one lithium hydroxide or lithium salt as defined herein and at least one manganese oxide or manganese salt as defined herein, and heating the mixture to a temperature in the range of from about 650° C. to about 800° C. to cause said compounds to react with each other by simultaneous decomposition to obtain said lithium manganese oxide having a spinel-type crystal structure and cubic close packed oxygen lattice construction.

A lithium salt as defined herein means a lithium compound which decomposes when heated in air to form an oxide of lithium and, correspondingly, a manganese salt as defined herein means a manganese compound which decomposes when heated in air to form an oxide of manganese.

The lithium compound may be a member of the group consisting of LiOH, $Li_2CO_3$, $LiNO_3$, and mixtures thereof; the manganese compound being a member of the group consisting of $MnO_2$ (either electrolytically or chemically prepared), $Mn_2O_3$, $MnCO_3$, $Mn_3O_4$, MnO, manganese acetate, and mixtures thereof. Forming the mixture may be in a stoichiometric ratio so that there is an at least approximate molar ratio of Li:Mn of 1:2, preferably with a slight excess of the lithium, i.e. such that the ratio is 1:2.0–1:1.67, preferably 1:1.94–1:1.82. Forming the mixture may be by mixing in a rotating drum mixer, a vibratory mill, a jet mill, a ball mill or the like so long as the salts are sufficiently intimately mixed.

The intimately mixed compounds are then transferred to a hopper, and thereby to the reactor by a screw feeder, a pneumatic conveyer, a pulsed air jet, or the like.

The reactor advantageously is a horizontal rotary calciner, a horizontal calciner with a rotating screw, a fluidized bed, a heated vibratory conveyor belt, or a cascade of vertical rotating hearths. The choice of reactor type will be dependent upon the other process parameters and the salts used.

Referring to FIG. 1, in one embodiment of the invention the starting material 1 is poured into feed hopper 2. This material falls by the action of gravity into a screw conveyor 3 which is used to control the feed rate of starting material to the reactor. The screw conveyor 3 discharges the starting material into a rotating shell reactor 5. Shell 5 may be rotated by any conventional rotating drive means. The solids travel down the length of the rotating shell 5, first passing through independently heated zones 6a, 6b, 6c surrounded by an outer shell. The solids are discharged from the rotating shell 5 through valve 9 into the product drum 10. The reactor is airtight in the space between the feed screw conveyor 3 and the discharge valve 9, and may be under some positive pressure from the atmosphere that comes in contact with the product before it is discharged from pipe 8, although as shown in the drawing the pressure in shell 5 is substantially atmospheric due to venting through pipe 8 to bag filter 11. The optional gas purge inlet pipe 7 allows a counter current flow of air or oxygen enriched gas to continuously flow over the reactants. The purge gas is vented from the reactor together with the off-gases through pipe 8. Drive means for the screw conveyors and rotating shell have not been shown since these are well known to those skilled in the art.

Referring to FIG. 2, the rotating shell 220 optionally has four equally spaced lift vanes 210 attached to the inside of the shell. These life vanes may be welded or otherwise suitably attached to the inside of rotary shell 220. Each of said vanes is spaced equidistantly from its adjacent vanes and each extends axially the full length of the rotating shell 220. The number of such vanes as well as their size may be varied considerably, as long as they function to keep the solids mixed and in intimate contact with the atmosphere in the shell. The vanes also aid in moving the solids through shell 220. In order to provide further assistance in moving the solids downstream through shell 220, the latter may be inclined downward in the direction of flow at a slope of up to ¼ inch per foot of reactor length; preferably 1/16 inch per foot. The size of the reactor may be varied depending upon the capacity desired.

The laboratory unit used for the examples consisted of a horizontal rotary tube furnace with a 2" diameter and a 3' heating zone. Gas flow rates were set between 50 and 500 cc/min. and rotation speed set at 30 RPM.

The analogous pilot unit consisted of a 6" diameter reactor with 8' of heating zones. Gas flow rate was set between 20–40 SCFH. Rotation speed was set between 3–10 RPM.

It is important to keep the reactants agitated during the process. The fluidizing motion allows for rapid heat transport and provides continuously renewed gas/surface interface exposure. It is this combination of conditions that allows the reaction kinetics of the process to be greatly enhanced compared to that of the static bed process.

The heating of the mixture advantageously is in an atmosphere continuously purged by a countercurrent flow of air, oxygen or oxygen enriched atmosphere to a temperature of from about 650° C. to about 800° C.; the mixture being held at the maximum temperature, preferably with an accuracy of ±10° C., for a period of at less than about 4 hrs, preferably less than about 2 hrs. The heating step may be followed by a cooling step by quenching in air or cooling at the natural furnace cooling rate.

The heating step of the present invention is carried out from about 650° C. to about 800° C. for a time not in excess of about four hours. Preferably the temperature of the heating step is from about 700° C. to about 750° C. for a time of from about one and one-half hours to about 2 hours.

After the heating step the reactant product advantageously is cooled to less than about 200° C. in about two hours or less. Preferably the product is cooled to less than about 100° C. and the cooling step is performed in less than about one and one-half hours. Where the cooling step is performed in one and one-half hours or less the product is advantageously annealed by allowing the product to uptake oxygen, thereby producing a distortion in the lattice. Where the cooling step is performed in about one and one-half hours or less advantageously the cooling is performed in at least two zones of progressively cooler temperatures. Preferably such cooling takes place in at least three distinct zones, each being progressively cooler than the immediately previous zone by at least about 90° C. Most preferably the temperatures in the three cooling zones are about 725° C., 625° C., and 525° C.

$Li_{1+x}Mn_{2-x}O_4$ products are characterized analytically in various ways, such as by standard chemical and spectroscopic methods to give the Li/Mn ratio and the Mn oxidation number. These methods were applied to the samples to confirm the formulas that are used to describe the materials.

One of the most useful analytical methods for characterization of these materials is x-ray diffraction (XRD), using powder techniques. XRD yields two type of useful information, (1) product purity and (2) lattice parameter. Since every substance has a unique, well-defined XRD pattern, comparison of an XRD pattern with standard patterns determines whether or not a single-phase product was obtained. Investigators have found some correlation between XRD patterns and battery performance. For example, spinels should have a clean $LiMn_2O_4$ XRD pattern without significant peaks from $Li_2MnO_3$, $Mn_2O_3$, and $Mn_3O_4$. These materials do not cycle and may do even further harm by leaching out of the cathode, causing a breakup of the good material in the cathode.

FIGS. 4, 5, 8 and 9 are clean $LiMn_2O_4$ XRD patterns for Samples B, C, I and K, respectively. The $LiMn_2O_4$ XRD peaks are identified by their well-known 2 θ positions, which are labeled with integers from 501 to 508. These 2 θ values can, of course, be converted to familiar crystal "d" values by standard methods, with the knowledge that the x-radiation was CuKα radiation. Although the XRD patterns appear almost identical for the above named materials, these four materials may be differentiated by the way in which they were synthesized, which is detailed in Table 1.

Figure 6:
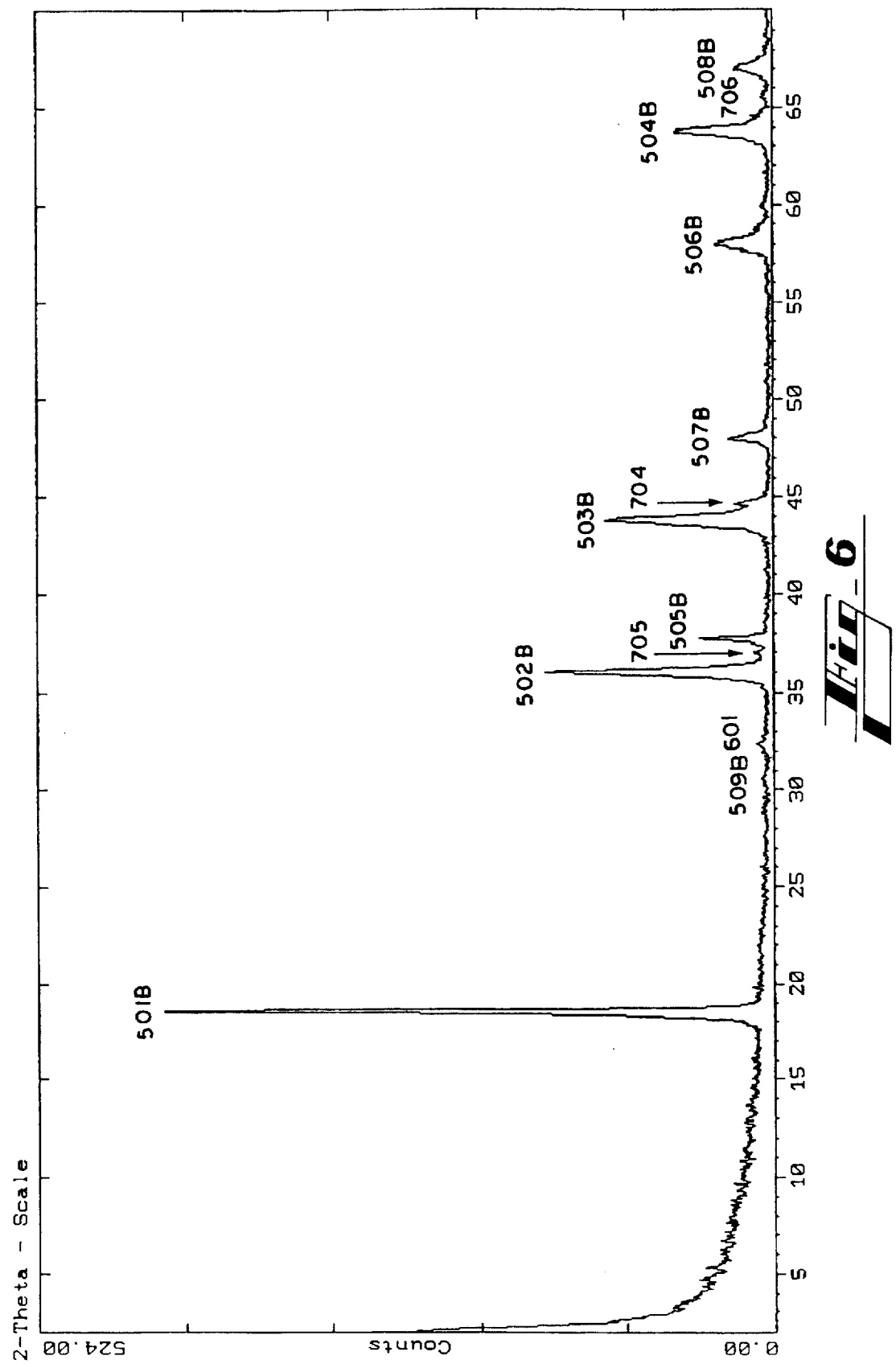
FIG. 6—[sample D] shows an X-ray diffraction pattern of $Li_{1+x}Mn_{2-x}O_4$ spinel prepared from $Li_2CO_3$ and EMD heated in rotary kiln at 725° C. under $N_2$ (1½ h) and air cooled.
Figure 7:
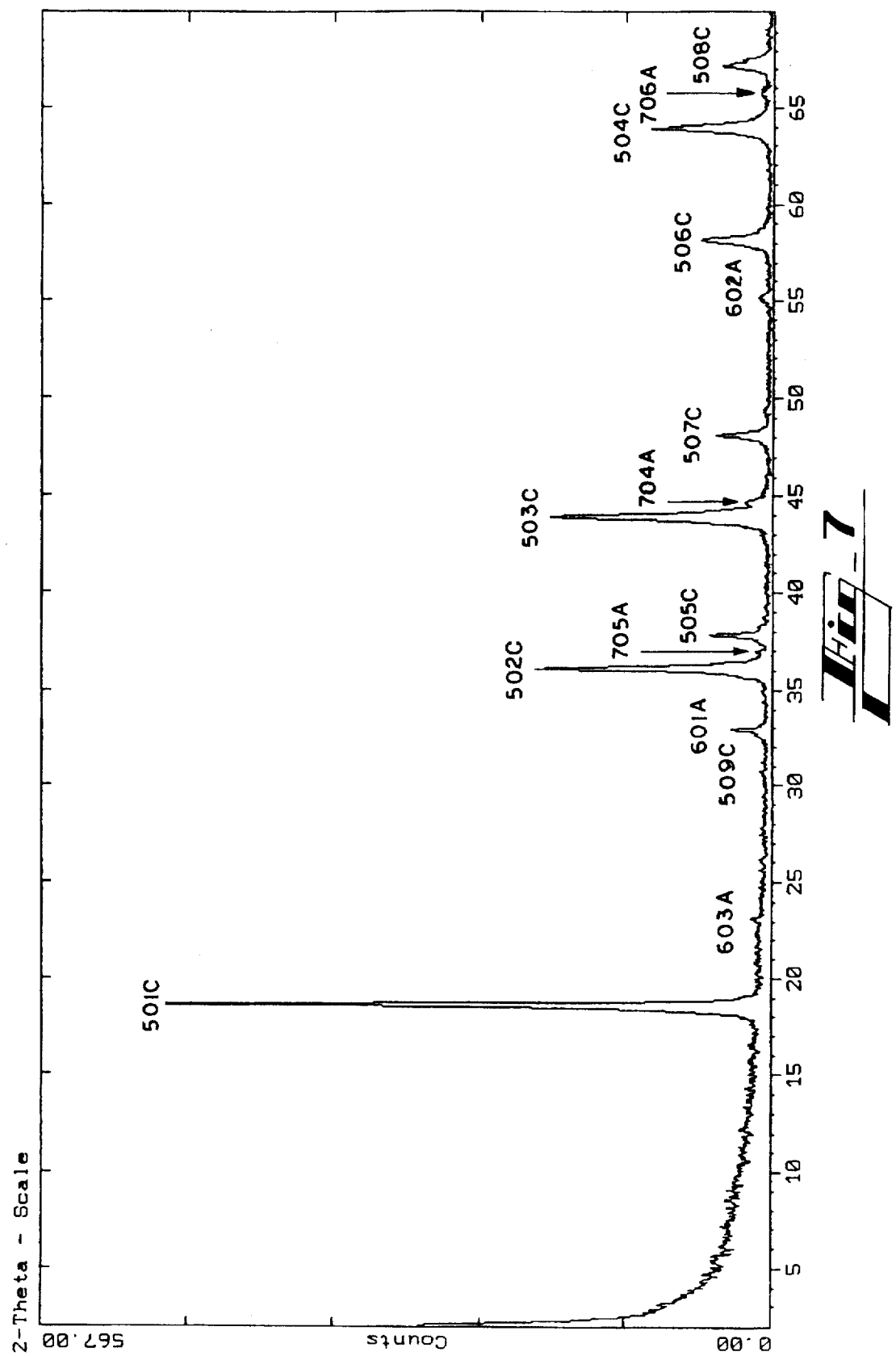
FIG. 7—[sample E] shows an X-ray diffraction pattern of control $Li_{1+x}Mn_{2-x}O_4$ spinel prepared from $Li_2CO_3$ and EMD heated in static bed at 725° C. in air (2 h) and air cooled.

FIGS. 6 and 7 show XRD patterns for spinels contaminated with byproducts. The peaks for the major product, $Li_{1+x}Mn_{2-x}O_4$, are labeled with the same integers as the corresponding peaks for the pure $Li_{1+x}Mn_{2-x}O_4$ in FIGS. 4, 5, 8, and 9. The peaks labeled with 700's integers belong to $Li_2MnO_3$ and those labeled with 600's integers belong to either $Mn_2O_3$ or $Mn_3O_4$ (these two compounds are difficult to differentiate from a very few small peaks).

The second type of XRD information, i.e., lattice parameter, cannot be obtained from visual inspection of the scans as shown in the figures. Rather, specialized techniques of "lattice parameter refinement," familiar to those skilled in the art of crystallography and XRD, very accurately examines the exact location of all the peaks, and from this information, calculates the best cubic spinel unit cell dimension on the crystallographic "a" axis; this is the lattice parameter, $a_o$.

Various investigators have shown that the lattice parameter can be a very diagnostic tool, as it often correlates directly with capacity fade rate, which is the decrease in discharge capacity with cycle number. The lattice parameter varies with the stoichiometry of the cubic Li-Mn spinel (i.e., with x in $Li_{1+x}Mn_2O_4$) and with the degree of oxidation of the spinel. $Li_{1.00}Mn_{2.00}O_4$ has a lattice parameter of $a_o$=8.2476 Å, (Standard X-ray Diffraction Powder Patterns, Section 21—Data for 92 Substances, by M. C. Moris, H. F. McMurdie, E. H. Evans, B. Paretzkin, H. S. Parker, W. Wong-Ng, D. M. Gladhill and C.R. Hubbard, National Bureau of Standards, U.S., Monograph 25, 21 78 (1984)). The value of $a_o$ decreases with Li removal (oxidation), attaining a value of 8.03 Å for the cubic $Mn_2O_4$ (λ-MnO2) phase. As lithium is added to $LiMn_2O_4$ (x>0 in $Li_{1+x}Mn_{2-x}O_4$), the manganese becomes more oxidized and $a_o$ decreases to about 8.2 Å [J. M. Tarascon, W. R. McKinnon, F. Coowar, T. N. Bowmer, G. Amatucci and D. Guyomard, J. Electrochem. Soc. 141 (1994) 1421–1431], and the capacity fade rate of the spinel decreases. The additional lithium and manganese oxidation causes a decrease in discharge capacity, the theoretical maximum 4-V discharge capacity being (1–3x) lithium ions/electrons per molecular unit of $Li_{1+x}Mn_{2-x}O_4$, as being determined by the highest theoretical Mn oxidation number being 4.00.

Samples of the lithium manganese oxide prepared in accordance with the described techniques were formed into positive secondary cell electrodes by intimately mixing with a small amount of graphite (10 to 40% by weight) and a binder (~5% by weight) to form a cathode mix; pressing this cathode mix onto a conductive backing; and then drying this cathode-mix/backing assembly (called the positive electrode) by heating in a dry gas stream. These electrodes were then tested in the usual manner in flat electrochemical test cells. One type of such cell is a demountable cell shown in FIG. 3. The cells were assembled in a dry argon atmosphere using the $Li_{1+x}Mn_{2-x}O_4$—containing positive electrode 301 with a conductive backing 302 separated from a lithium foil negative electrode 303 with stainless steel conductive backing 304 by porous glass fiber and/or polypropylene and/or polyethylene separator papers 305 and 306 saturated with an electrolyte comprising a mixture of 1 molar lithium hexafluorophosphate ($LiPF_6$) in a 50/50 wt/wt solution of ethylene carbonate (EC) and dimethyl carbonate (DMC). These active cell components were pressed into intimate contact such as to be insulated from the atmosphere. In the demountable cell of FIG. 3, this was accomplished by the two flat cylindrical cell halves 307 and 308 that made up the cell body. The two polypropylene pieces, between which the active cell sandwich was placed, were drawn together with bolts (not shown in FIG. 3) to press the cell components together. A polypropylene-polyethylene "O" ring 309 around the periphery of this cell between the two cylindrical halves 307 and 308 both served to seal the cell from electrolyte escape or air entry and to take the excess pressure of the bolts once the cell components were drawn together. The two cell halves were constructed with metal bolts sealed into their centers 310 and 311, such that these bolts conducted the current into and out of the active cell components. O-rings also were used to ensure a tight seal around the current collector bolts 312 and 313. The bolts were held firmly against the "O" rings with nuts 314 and washers 315.

Figure 10:
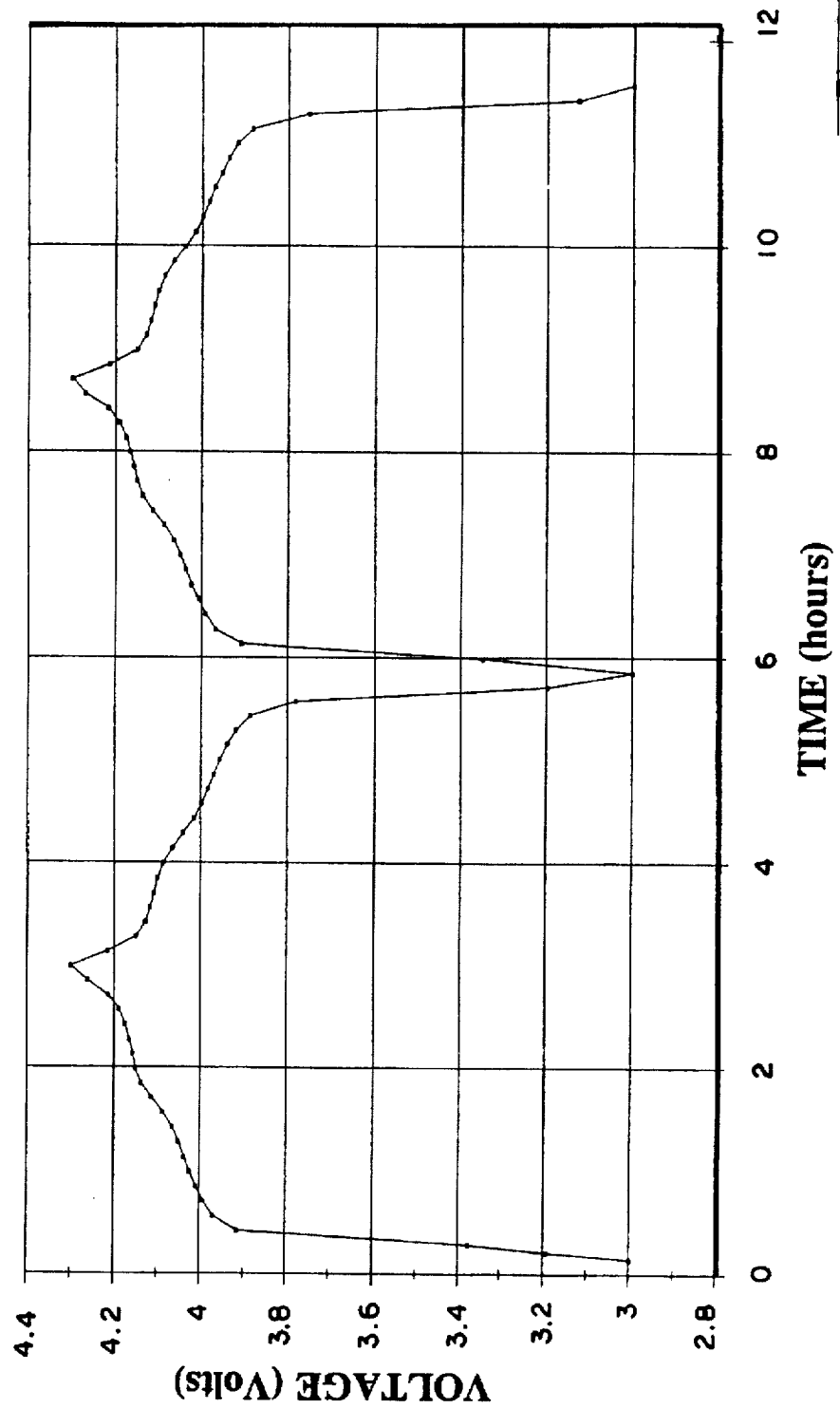
FIG. 10—[sample C] shows cycling curve (voltage vs. time) for spinel over two cycles.

The test cells were then evaluated to determine the behavior of cell voltage during charge-discharge cycles as a function of the change in lithium content per formula unit during the progressive reversible transformation of Li1+xMn$_{2-x}$O$_4$. When charging is initiated (i.e., with cell voltage~3.1–3.5 volts), the manganese begins to oxidize and lithium ions transport out of the $Li_{1+x}MN_{2-x}O_4$ through the electrolyte and into the lithium foil. The process proceeds until a voltage of 4.3 volts is reached, a potential at which most of the lithium atoms have been transferred to the lithium anode. The cell was then discharged to 3.0 volts and recharged many times at a rate of 0.5 mA/cm² of cathode area. Two such charge and discharge cycles are shown in FIG. 10.

Figure 11:
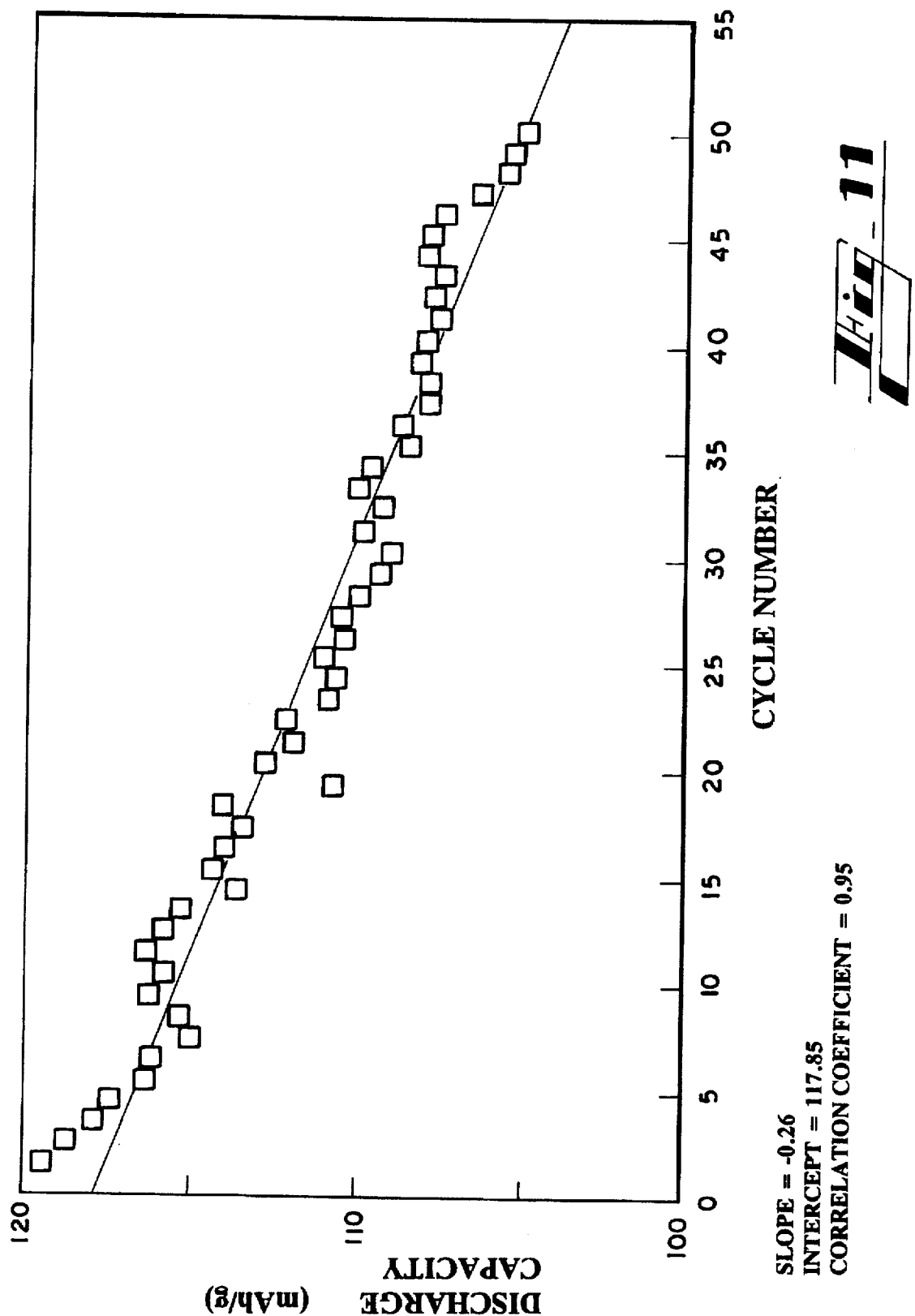
FIG. 11—[sample K] shows typical plot of discharge capacity vs. cycle number to show (least squares) manner of obtaining 50-cycle fade rate.

The cell passed roughly 120 milliamp hours of charge per gram of active cathode material, $Li_{1+x}Mn_{2-x}O_4$, for each half cycle. This quantity of charge decreased with cycle number, as is typical for any battery system. This decrease, termed cycle fade, is one of the most important battery performance features of cathode materials, along with the initial discharge capacity. The maximum discharge capacity for the cell was recorded. This usually was the discharge capacity on the first cycle, although for a small fraction of the cells, the capacity maximized on the second or even the third cycle. The fade rate for the cell was calculated as the least squares slope of the line through the graph of discharge capacity vs. cycle number after 30 and 50 cycles (see FIG. 11). This slope, in milliamp hours per gram of $Li_{1+x}Mn_{2-x}O_4$, was converted to fade rate in percent capacity loss per cycle by dividing the slope by the initial discharge capacity and multiplying by 100.

Spinels were synthesized by the proposed process in a pilot-scale rotary kiln (reactor). Spinels were also synthesized by various other published or patented processes, for comparison with those made by the proposed process. These methods included (a) standard laboratory procedures, i.e., thermal reaction in a muffle furnace followed by cooling in the ambient atmosphere, (b) standard laboratory procedures but with slow cooling (which employed a computerized controller on the furnace), and (c) air cooling followed by special annealing at 850° C. and then very slow cooling (10° C./h) to 500° C. or room temperature. Syntheses were also conducted in the pilot reactor with various modifications, for the purpose of evaluating various processing parameters.

It is well known that during the "very slow cool/anneal" step in air or an oxygen enriched atmosphere, the spinel absorbs oxygen into the crystal lattice. This phenomena can be observed by monitoring the weight increase using Thermal Gravimetric Analysis (TGA).

Using the slow cooling process in accordance with the invention, the cooling rate can be greatly increased if the spinel material is allowed to be continuously agitated. This provides a much greater exposure of solid/gas interfaces. In addition, the continuous purging of air or oxygen allows for a continuous availability of oxygen at the surface interface for rapid absorption into the lattice.

As the examples will show, the capacity and rate of cycle fade for the spinel made by the proposed process were about equivalent to those for spinels made by the optimum previously discussed laboratory processes, which involve many hours or even days of heating and cooling time. On the other hand, when the laboratory processes were performed for just a few hours, comparable to the times employed with the proposed methods, the capacities were substantially lower and, in some cases, the fade rates were higher.

Numerous samples were evaluated so as to lend credence to correlations. Each sample has been battery cycled in replicate tests, so as to provide the uncertainty in each test. Thus, differences in capacities and fade rates are subject to statistical examination. The description of how the materials were made is given in Table I and all mean results and standard deviations ($\sigma$) are shown in Table II.

Most of the important features of the claimed process are explained here by pairwise comparisons of tests (as opposed to a linear multiple regression of all data). When pairwise comparisons are made, it is desirable to keep all parameters constant except for the one under investigation. For example, when comparing different heat/cooling treatments, it desirable to compare the same material. Also, if comparing different materials for a given compositional difference (e.g., ratio of lithium to manganese), it is desirable that the materials are made from the same precursor EMDs and lithium compounds. This has been done as far as possible. All the example spinels are synthesized from Kerr-McGee Chemical Corporation alkaline battery grade EMD, which has very repeatable specifications. Materials synthesized from the same lithium compound—i.e., either lithium hydroxide or lithium carbonate—were compared where possible.

EXAMPLE 1

The examples of the invention are as good as or better than any other materials tested. The process used for the invention examples consisted of reaction in the rotary kiln under air for ~2 h, cooling in a rotary kiln under air for ~2 h, and manufactured with excess lithium—i.e., $Li/Mn_2$=1.05 (rather than $Li/Mn_2$=1.00). The examples of the invention are Samples B and C. These two samples were identically processed except that the cooling was done in a small laboratory rotary kiln (after first reheating the sample to 725° C.) and under an atmosphere of $O_2$ in the case of Sample B, whereas the sample was zone-cooled in the pilot kiln under air in the case of Sample C. Table II shows that B and C exhibit adequate discharge capacities and the lowest fade rates (or equivalent thereto) in the table. Furthermore, their XRD patterns (FIGS. 4 AND 5) are clean and lattice parameters are among the lowest lattice parameters.

Figure 8:
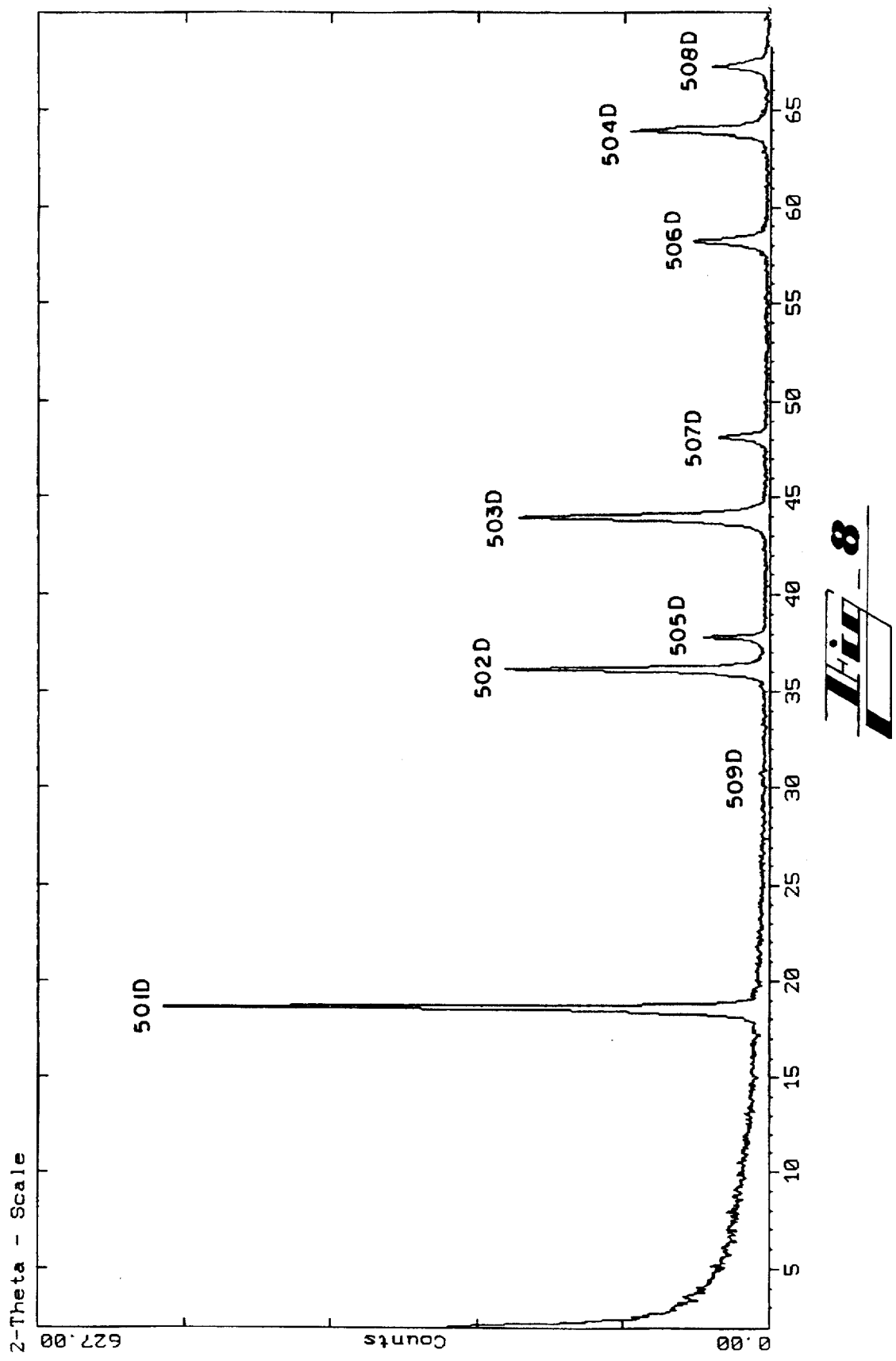
FIG. 8—[sample I] shows an X-ray diffraction pattern of control $Li_{1+x}Mn_{2-x}O_4$ spinel prepared from LiOH and EMD heated in static bed at 725° C. in air (2 h) and air cooled.
Figure 9:
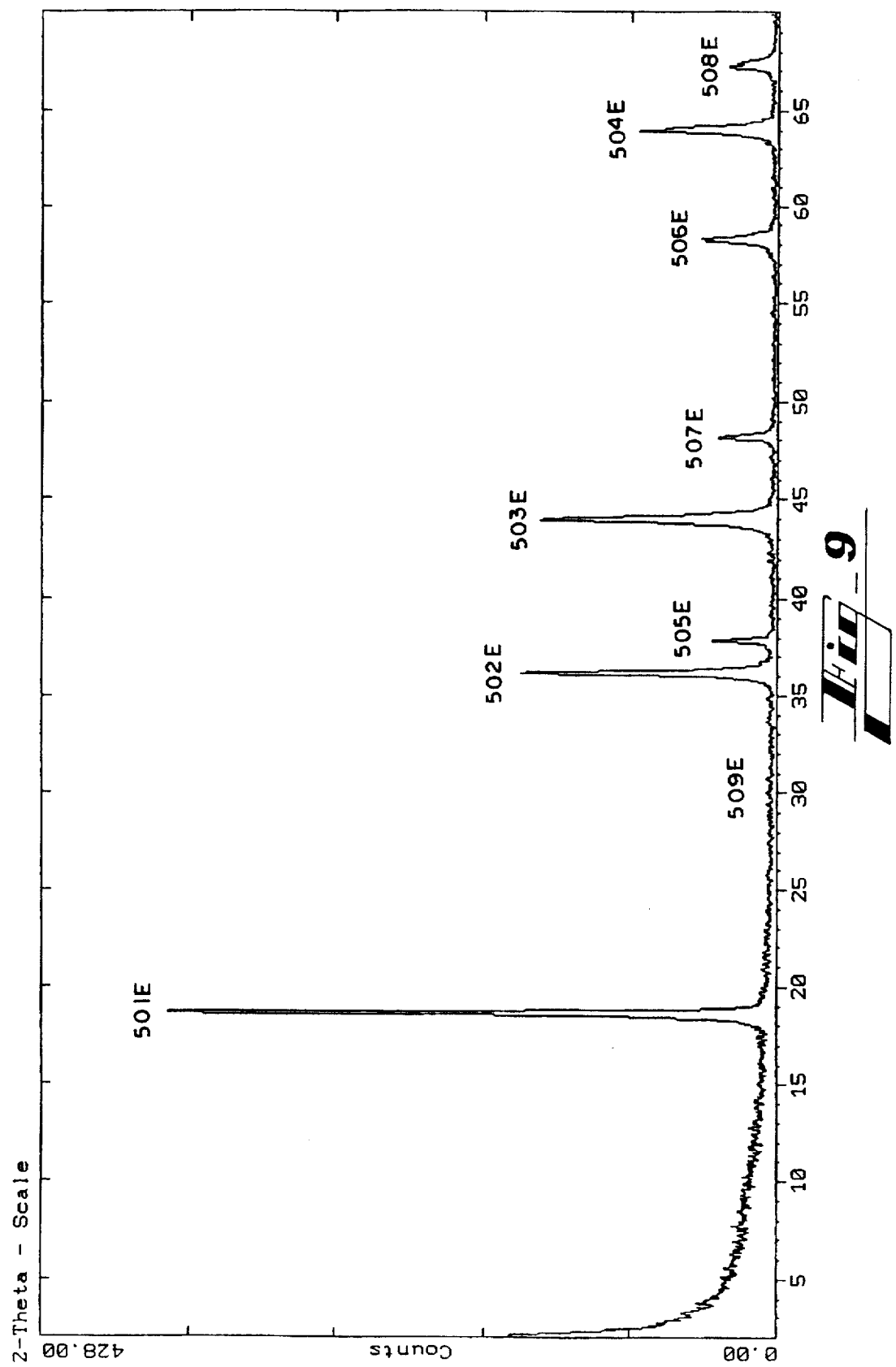
FIG. 9—[sample K] shows an X-ray diffraction pattern of control $Li_{1+x}Mn_{2-x}O_4$ spinel prepared from $Li_2CO_3$ and EMD heated in static bed at 725° C. in air (24 h) and slow cooled (36 h).

In particular, the examples of the invention are as good as materials made by long laboratory routes (static bed furnace), which involve 20 h reaction time and either: (a) 12 h cooling times (60° C./h), termed "laboratory-slow-cooling," or (b) treatment that involves annealing the sample above 800° C. and cooling very slowly, i.e., at 10° C./h, termed [anneal/very slow cool]. Specific comparisons from Table II are:

a. B & C (invention) vs H (the "same" pilot material but [anneal/very slow cool]after synthesis) shows that the invention material is as good as, if not better than, the material that was [annealed/very slowly cooled].

b. Sample I is a laboratory-prepared sample with precursors and composition equivalent to those of the invention samples, but Sample I received [anneal/very slow cool] treatment. Material I is no better, on the average, than B & C. The 50-cycle fade rate of I and the capacity are statistically equivalent to those of the other two, because the standard deviation for the "I" values are so great. Sample I produced a clean XRD pattern (FIG. 8).

c. Sample K is equivalent to B & C in precursor and composition, but K was reacted for 20 h in the laboratory static furnace and then "laboratory-slow-cooled" rather than given [anneal/very slow cool] treatment. Sample K, although one of the best materials, is no better than B & C in capacity and fade rate. The XRD pattern for K is clean (FIG. 9).

d. Sample L' is a pilot material made from $Li_2CO_3$ and then given [anneal/very slow cool] treatment. (The parallel [anneal/very slow cooled] sample, H, was made from LiOH). No inventive example was made from $Li_2CO_3$. However, Sample O is a laboratory prepared sample that is identical to L', except that it was laboratory-slow-cooled. Sample O is as good as Sample L', indicating that the [anneal/very slow cool] treatment is no improvement over reaction at 725° C. followed by laboratory-slow-cooling.

e. Sample G is a pilot material that was synthesized equivalently to L', but reheated and laboratory-slow-cooled. Sample G exhibits a lower fade rate than L', indicating, as in (d), that the [anneal/very slow cool] treatment may even be inferior to 725° C. followed by laboratory-slow-cooling.

g. Samples I vs I' and J vs J' indicate that [anneal/very slow cool] treatment of materials prepared at 725° C. improves the performance.

EXAMPLE 2

The present invention shows in Table II that (1) the rotary kiln with air flow allows reaction times of only ~2 h, whereas reaction in a static furnace for 2 h gives a completely unsuitable product and (2) a reaction time of ~20 h in a static laboratory furnace is required to yield the same effect as ~2 h reaction in a rotary kiln with air. For this example, air cooling was employed, as laboratory-slow-cooling would, in effect, lengthen the reaction time from 2 h and confound the test.

a. Sample M was synthesized in the static furnace for just 2 h and then air cooled. This process contaminated the material with deleterious byproducts, as the XRD scan shows. The initial capacity is only 76.8 mAh/g, and two of four cells assembled would not even cycle 10 times. These problems are due to the high level of impurities. This material is completely unsuitable as a battery cathode. The comparable starting material, made from LiOH with Li/Mn$_2$=1.00 but reacted 20 h in the static furnace, is Sample N. This material exhibited a good XRD pattern and initial capacity, although the fade rate is mediocre by the standards of the good materials. No material was made in rotary kilns with Li/Mn$_2$=1.00.

b. Samples A and F are two materials that were started from equivalent pre-mixes and then reacted in the rotary kiln with air flow, followed by air cooling. Sample I', equivalent in precursors and composition to A and F, was made in the static/lab furnace with reaction time =20 h. The rotary samples (A & F), are as good in both discharge capacity and fade rate as the material reacted for 20 h in the lab furnace (I'). This example and 2.a indicate that the 2 h reaction in the rotary kiln is about equally effective to that in the static furnace at 20 h, and would be substantially more effective than 2 h reaction in a static furnace.

c. Three samples from equivalent (Li$_2$CO$_3$) precursor and of equivalent composition are: E (made in the static laboratory furnace with only 2 h reaction time and then air cooled), L (made in the pilot rotary kiln with 2 h reaction time and then air cooled, and J' (made in the static laboratory furnace with 20 h reaction time and then air cooled). The E process resulted in contaminated material (cf XRD pattern of FIG. 7) and has a somewhat low discharge capacity (112 mAh/g). J' also showed a somewhat low capacity, although its XRD pattern was clean. L, the pilot sample, showed the best capacity of the three, and also had a clean XRD pattern. The fade rates were mediocre to poor in all cases, although, surprisingly, the 2 h laboratory sample showed the best fade rate.

EXAMPLE 3

An oxygen containing gas in the rotary is necessary for the inventive process. This is shown in Table II by Sample D, which was made with N$_2$ flowing through the kiln during the reaction and cooling. The capacity is unacceptably low (101 mAh/g), corresponding to the contaminated XRD scan (FIG. 6). The fade rate also is mediocre to poor. The comparable sample with air in the rotary kiln is L, which shows an acceptable capacity and clean XRD scan, proving its superiority over D. The fade rate of L is comparable to that of D, although the fade rate of L operates from a higher capacity. Results for invention examples B and C show that either oxygen or air atmosphere is satisfactory.

EXAMPLE 4

The inventive process of slow/zone cooling in the rotary kiln (2 h) is advantageous. As shown in Table II, this is demonstrated by comparing Samples B and C, which are so-cooled, with Sample A, which is the identical premix and reaction product but air cooled. Samples B and C show significantly better capacities and especially fade rates than A.

EXAMPLE 5

Table II shows that in the inventive process a Li/Mn$_2$ ratio greater than 1.00 is beneficial. No sample was made and cooled in the rotary kiln for which Li/Mn$_2$ ratio=1.00; i.e., there was no direct comparison with Samples B and C. This is because it had been previously established, with laboratory synthesized materials, that there was a definite benefit with excess lithium. Therefore there was no need to produce poorer materials in the pilot plant. Above (1.c) we showed that "inventive" synthesis was as good as the best laboratory synthesis, the latter being 20 h reaction time and laboratory-slow-cooling (i.e., 60° C./h or 12 h cooling). Therefore, when the best laboratory materials are shown to be superior to materials that are identical except that Li/Mn$_2$=1.00, it may be inferred that pilot (inventive process) materials with Li/Mn$_2$>1.00 would be better than the inventive process materials with Li/Mn$_2$=1.00.

Sample K, which is equivalent to inventive process materials B and C, is compared to K', which is equivalent except that Li/Mn$_2$=1.00. Sample K' shows a greater capacity than K, which is anticipated from theory. However, the capacity of K is still great enough to be suitable. In fade rate, which is the needed feature, Sample K is much superior to Sample K'. By inference, inventive process materials should be better than rotary materials with Li/Mn$_2$=1.00.

Table I

Sample Preparations and Descriptions

Sample A: Pilot material. Li/Mn$_2$=1.05. LiOH/EMD reacted@725° C. in rotary kiln with air for 2 h. Air cooled.

Sample B: Sample A reheated to 725° C. in lab rotary kiln and slow cooled therein under O$_2$ to ambient@300° C./h.

Sample C. Pilot material. Sample A zone cooled in pilot rotary kiln under air, which required 2 h.

Sample D. Pilot material. Li/Mn$_2$=1.05. Li$_2$CO$_3$/EMD reacted in rotary kiln@725° C. with N$_2$ for 2 h. Air cooled.

Sample E. Lab material. Li/Mn$_2$=1.05. Li$_2$CO$_3$/EMD reacted in static furnace@725° C. for 2 h. Air cooled.

Sample F. Pilot material. Li/Mn$_2$=1.05. LiOH/EMD reacted@725° C. in rotary with air for 2 h. Air cooled.

Sample G. Pilot material. Li/Mn$_2$=1.05. Li$_2$CO$_3$ reacted in rotary@725° C. with air for 2 h. Air cooled. Reheated to 725° C. and slow cooled in static lab furnace at 60° C./h.

Sample H. Pilot material. Sample B reheated in static lab furnace to 850° C. and cooled to room temperature very slowly (i.e., at 10° C./h).

Sample I'. Lab material. Li/Mn$_2$=1.05. LiOH/EMD reacted@725° C. in static furnace for 20 h. Air cooled.

Sample I. Lab material. Sample I' reheated in static furnace to 850° C. and cooled to 500° C. very slowly (i.e., at 10° C./h), and then furnace turned off for quick cooling to room temperature.

Sample J'. Lab material. Li/Mn$_2$=1.05. Li$_2$CO$_3$/EMD reacted@725° C. in static furnace for 20 h. Air cooled.

Sample J. Lab material. Sample J' reheated in static furnace to 850° C. and cooled very slowly (at 10° C./h) to 500° C., and then furnace turned off for quick cooling to room temperature.

Sample K. Lab material. Li/Mn$_2$=1.05. LiOH/EMD reacted@725° C. for 20 h in static furnace. Then slow cooled to room temperature at 60° C./h. (Note: this "lab slow cooling" is much faster than Bellcore cooling of 10° C./h).

Sample K'. Lab material. Li/Mn$_2$=1.00. LiOH/EMD reacted@725° C. in static furnace for 20 h. Then "lab-slow-cooled" to room temperature at 60° C./h.

Sample L: Pilot material. Li/Mn$_2$=1.05. Li$_2$CO$_3$/EMD reacted@725° C. in rotary kiln with air for 2 h. Air cooled.

Sample L'. Pilot material. Sample L reheated to 850° C. in lab, static furnace and cooled therein@10° C./h to room temperature.

Sample M. Lab material. Li/Mn$_2$=1.00. LiOH/EMD reacted in static furnace@725° C. for 2 h. Air cooled.

Sample N. Lab material. Li/Mn$_2$=1.00. LiOH/EMD reacted in static furnace@725° C. for 20 h. Air cooled.

Sample O. Lab material. Li/Mn$_2$=1.05. Li$_2$CO$_3$/EMD reacted in static furnace@725° C. for 20 h. The "lab-slow-cooled"—i.e.,@60° C./h.

TABLE II

| Sample | XRD Scan | Lattice Parameter (Å) | Mean Capacity, mAH/g ± σ | Mean Face, % per Cycle ± σ 30 Cycles | Mean Face, % per Cycle ± σ 50 Cycles | n* |
|---|---|---|---|---|---|---|
| A | Clean LiMn$_2$O$_4$ pattern | 8.2402 | 112 ± 13 | 0.38 ± 0.05 | 0.29 ± 0.03 | 2 |
| B | Clean LiMn$_2$O$_4$ pattern | 8.2342 | 117.1 ± 0.4 | 0.24 ± 0.04 | 0.22 ± 0.019 | 2 |
| C | Clean LiMn$_2$O$_4$ pattern | 8.2344 | 126 ± 5 | 0.26 ± 0.02 | 0.20 ± 0.01 | 2 |
| D | Pattern includes significant Li$_2$MnO$_3$ & Mn$_3$O$_4$ peaks | 8.2550 | 101 ± 3 | 0.80 ± 0.12 | 0.47 ± 0.04 | 3 |
| E | Pattern includes significant Li$_2$MnO$_3$ & Mn$_3$O$_4$ peaks | 8.2468 | 112 ± 1.6 | 0.42 ± 0.09 | 0.34 ± 0.04 | 4 |
| F | Clean LiMn$_2$O$_4$ pattern | 8.2466 | 129.7 ± 0.7 | 0.41 ± 0.04 | 0.31 ± 0.03 | 3 |
| G | Clean LiMn$_2$O$_4$ pattern | 8.2397 | 119.7 ± 6.1 | 0.37 ± 0.06 | 0.30 ± 0.06 | 6 |
| H | Clean LiMn$_2$O$_4$ pattern | 8.2302 | 122.5 ± 0.2 | 0.24 ± 0.02 | 0.23 ± 0.03 | 2 |
| I | Clean LiMn$_2$O$_4$ pattern | 8.2338 | 121.0 ± 8.5 | 0.33 ± 0.10 | 0.25 ± 0.08 | 2 |
| I' | Clean LiMn$_2$O$_4$ pattern | 8.2340 | 115 ± 6 | 0.37 ± 0.12 | 0.34 ± 0.15 | 2 |
| J | Clean LiMn$_2$O$_4$ pattern | 8.2407 | 123.9 ± 5.7 | 0.65 ± 0.03 | 0.46 ± 0.05 | 2 |
| J' | Clean LiMn$_2$O$_4$ pattern | 8.2440 | 113.1 ± 1.0 | 0.72 ± 0.13 | 0.67 ± 0.08 | 3 |
| K | Clean LiMn$_2$O$_4$ pattern | 8.2338 | 115 ± 11 | 0.27 ± 0.14 | 0.23 ± 0.07 | 5 |
| K' | Clean LiMn$_2$O$_4$ pattern | 8.2450 | 132 ± 9 | 0.61 ± 0.07 | 0.47 ± 0.03 | 5 |
| L | Clean LiMn$_2$O$_4$ pattern | 8.2400 | 119.6 ± 3.9 | 0.70 ± 0.09 | 0.47 ± 0.02 | 4 |
| L' | Clean LiMn$_2$O$_4$ pattern | 8.2457 | 131.6 ± 1.0 | 0.53 ± 0.08 | 0.39 ± 0.01 | 2 |
| M | Pattern includes significant Li$_2$MnO$_3$ & Mn$_3$O$_4$ peaks | — | 76.8 ± 1.7 | 0.35 (2 cells failed to charge) 0.22 | | 3 |
| N | Clean LiMn$_2$O$_4$ pattern | 8.2467 | 124.6 ± 3.3 | 0.60 ± 0.035 | 0.45 ± 0.037 | 3 |
| O | Clean LiMn$_2$O$_4$ pattern | 8.2407 | 110 ± 7 | 0.41 ± 0.09 | 0.38 ± 0.08 | 3 |

*n = Number of cells tested.

What is claimed is:

1. A continuous method of preparing a single phase lithiated manganese oxide intercalation compound of the formula Li$_{1+x}$Mn$_{2-x}$O$_4$ having a spinel-type structure comprising the steps of:
   (a) mixing intimately in amounts, based on said lithiated manganese oxide compound, a lithium hydroxide or a lithium salt and a manganese oxide or a manganese salt;
   (b) feeding the intimately mixed compounds to a reactor;
   (c) continuously agitating the mixed compounds in the reactor;
   (d) heating the agitated mixed compounds in the reactor in the presence of air or an oxygen-enriched atmosphere at a temperature of from about 650° C. to about 800° C. for a time not in excess of about 4 hours to form;
   (e) cooling the reacted product to less than about 200° C. in less than about 2 hours; wherein x is from about 0.0328 to about 0.125 and the a-axis lattice parameter is about 8.235 Å or less.

2. The method according to claim 1 further including cooling the reacted product to less than about 100° C.

3. The method according to claim 1 further including after the cooling step the step of removing the cooled product from the reactor.

4. The method according to claim 1 wherein step (a) is performed by a rotating drum mixer.

5. The method according to claim 1 wherein step (a) is performed by a ball mill.

6. The method according to claim 1 wherein step (a) is performed by a vibratory mill.

7. The method according to claim 1 wherein step (a) is performed by a jet mill.

8. The method according to claim 1 wherein feeding step (b) is performed by a screw feeder.

9. The method according to claim 1 wherein feeding step (b) is performed by a pneumatic conveyor.

10. The method according to claim 1 wherein feeding step (b) is performed by a pulsed air jet.

11. The method according to claim 1 wherein the atmosphere is continuously purged with a flow of air, oxygen or oxygen-enriched air during step (c).

12. The method according to claim 1 wherein the atmosphere is continuously purged with a countercurrent flow of oxygen enriched atmosphere during step (c).

13. The method according to claim 1 wherein the reactor is a horizontal rotary tube with the exit end slightly lower than the entrance end.

14. The method according to claim 1 wherein the reactor is a horizontal calciner with a rotating screw.

15. The method according to claim 1 wherein the reactor is a fluidized bed.

16. The method according to claim 1 wherein the reactor is a heated vibratory conveyor belt.

17. The method according to claim 1 wherein the reactor is a cascade of vertical rotating hearths.

18. The method according to claim 1 wherein the heating step is performed in about 2 hours or less.

19. The method according to claim 1 wherein the heating step is performed in about one and one-half hours or less.

20. The method according to claim 19 wherein the heating step temperature is from about 700° C. to about 800° C.

21. The method according to claim 1 including continuous purging with a flow of air, oxygen or oxygen-enriched atmosphere during step (d).

22. The method according to claim 21 wherein the continuous purging is with a countercurrent flow of air.

23. The method according to claim 1 wherein the cooling step is performed in a horizontal calciner with a rotating screw.

24. The method according to claim 1 wherein the cooling step is performed in a fluidized bed.

25. The method according to claim 1 wherein the cooling step is performed in a rotary kiln.

26. The method according to claim 1 wherein the cooling step is performed in a heated vibratory conveyor belt.

27. The method according to claim 1 wherein the cooling step is performed in a cascade of vertical rotating hearths.

28. The method according to claim 1 wherein the cooling step is performed in about one and one-half hours or less.

29. The method according to claim 1 wherein said cooling step is performed in less than about 1 and ½ hours.

30. The method according to claim 1 wherein the cooling step is performed in zones of progressively cooler temperatures.

31. The method according to claim 30 wherein the cooling step is performed in at least two zones.

32. The method according to claim 31 wherein the temperature in each progressive cooling zone is at least about 90° C. lower than the immediately previous zone.

33. The method according to claim 32 wherein the temperatures in the progressive cooling zones are about: 725° C., 625° C., and 525° C.

34. The method according to claim 32 wherein the temperatures in the progressive cooling zones are about: 800° C., 650° C., and 500° C.

35. The method according to claim 32 wherein the temperatures in the progressive cooling zones are about: 750° C., 600° C., and 450° C.

36. The method according to claim 32 for preparing a spinel structure lithiated intercalation compound of the formula $Li_{1+x}Mn_{2-x}O_4$ wherein said cooled product is annealed by allowing the product to uptake oxygen.

37. The method according to claim 36 wherein said cooled product is annealed by allowing the product to uptake the maximum amount of oxygen.

38. The method according to claim 1 wherein the atmosphere is continuously purged with a flow of air, oxygen or an oxygen-enriched atmosphere during the cooling step.

39. The method according to claim 38 wherein the atmosphere is continuously purged with a countercurrent flow of air during the cooling step.

40. The method according to claim 1 wherein the manganese oxide or manganese salt is selected from the group consisting of $MnO_2$, $MnCO_3$, $Mn_2O_3$, $Mn_3O_4$, MnO, manganese acetate and mixtures thereof.

41. The method according to claim 1 wherein the manganese oxide has been heat treated prior to step (a).

42. The method according to claim 1 wherein the lithium hydroxide or lithium salt is selected from the group consisting of LiOH, $Li_2CO_3$, $LiNO_3$ and mixtures and hydrates thereof.

43. The method of claim 41 wherein the $MnO_2$ is neutralized by LiOH or $NH_4OH$ during its synthesis.

44. The method according to claim 1 which comprises the additional steps, prior to said cooling step, of:
(i) removing the product from the reactor; and
(ii) transferring the reacted product to a separate vessel.

45. The method according to claim 1 wherein heating step (d) is performed in zones of progressively warmer temperatures.

46. The method according to claim 45 wherein the heating step is performed in at least four zones.

47. The method according to claim 46 wherein the temperature in each progressive heating zone is at least 25° higher than the immediately previous zone.

48. The method according to claim 45 wherein the agitated mixed compounds remain in each zone at least about 30 minutes.

49. A method of synthesizing a lithium manganese oxide of the formula $Li_{1+x}Mn_{2-x}O_4$ having a spinel-type crystal structure with an a-axis lattice parameter of about 8.235 Å or less, and wherein x is from about 0.0328 to about 0.125 comprising forming an intimate mixture in finely divided solid form of at least one lithium hydroxide or lithium salt reactant selected from the group consisting of LiOH, $Li_2CO_3$, $LiNO_3$ and mixtures thereof and at least one manganese oxide or manganese salt reactant selected from the group consisting of $MnO_2$, $Mn_2O_3$, $MnCO_3$, $Mn_3O_4$, MnO, manganese acetate and mixtures thereof and continuously agitating and heating the mixure in a reactor under a continuous purge of countercurrent air at a temperature in the range of from about 650° C. to about 800° C. for a period not in excess of about 4 hours to cause said reactants to react with each other to form said lithium manganese oxide.

50. The method according to claim 49, wherein the heating of the mixture is in air at a temperature of from about 700° C. to about 800° C., the mixture being held at the maximum temperature for a period of less than about 2 hours.

51. The method according to claim 49 wherein the manganese oxide has been heat treated prior to forming the mixture.

52. The method according to claim 49, wherein the $Li_{1+x}Mn_{2-x}O_4$ has a $(Mn_2)O_4$ $(Mn_2)O_4^{n-1}$ framework structure in which the quantity of Mn cations varies from the stoichiometric value.

53. A lithium manganese oxide having a spinel crystal structure, synthesized by the method of claim 49.

54. A method of preparing a single phase lithiated manganese oxide intercalation compound of the formula $Li_{1+x}Mn_{2-x}O_4$ having a spinel-type structure by a batch process comprising the steps of (a) fixing intimately in stoichiometric mounts, based on said lithiated manganese oxide compound, a lithium hydroxide or a lithium salt and a manganese oxide or a manganese salt;

(b) feeding the intimately mixed compounds to a reactor;

(c) agitating the mixed compounds in the reactor;

(d) heating the agitated mixed compounds in the reactor in the presence of air or an oxygen-enriched atmosphere at a temperature of from about 650° C. to about 800° C. for a time not in excess of about 4 hours to form an oxygen deficient spinel structure intercalation compound; and (e) cooling the oxygen deficient product to less than about 100° C. in about 2 hours or less; to form $Li_{1+x}Mn_{2-x}O_4$ wherein x is from about 0.0328 to about 0.125 and the a-axis lattice parameter is about 8.235 Å or less.

55. The method according to claim 54 wherein the cooling vessel is a horizontal calciner with a rotating screw.

56. The method according to claim 54 wherein the cooling vessel is a fluidized bed.

57. The method according to claim 54 wherein the cooling vessel is a heated vibratory conveyor belt.

58. The method according to claim 54 wherein the cooling vessel is a cascade of vertical rotating hearths.

59. The method according to claim 54 wherein the cooling vessel is a rotary kiln.

60. The method according to claim 54 wherein the cooling step is performed in about one and one-half hours or less.

61. The method according to claim 54 wherein said cooling step is performed in less than about 1 hour.

* * * * *